United States Patent [19]

Richardson

[11] 3,967,867

[45] July 6, 1976

[54] ROLLER BEARINGS

[75] Inventor: John K. Richardson, Hedon, England

[73] Assignee: Priestman Brothers Limited, Hull, England

[22] Filed: Jan. 7, 1975

[21] Appl. No.: 539,140

[30] Foreign Application Priority Data

Feb. 4, 1974 United Kingdom................. 5049/74

[52] U.S. Cl............................. 308/207 R; 308/214; 308/174; 308/219; 308/198
[51] Int. Cl.² ......................................... F16C 27/04
[58] Field of Search................ 308/202, 207 R, 214, 308/218, 219, 235, 174

[56] References Cited
UNITED STATES PATENTS 2,435,839  2/1948  McNicoll ............................ 308/214
2,628,137  2/1953  Ashton................................ 308/218

Primary Examiner—M. H. Wood, Jr.
Assistant Examiner—Richard A. Bertsch
Attorney, Agent, or Firm—Sughrue, Rothwell, Mion, Zinn & Macpeak

[57] ABSTRACT

The invention concerns a bearing assembly having inner and outer bearing rings and two axially spaced coaxial annular passageways between said bearing rings and a number of rollers retained within said passageways, some of said rollers being inclined in one sense to the axis of said bearing and the others of said rollers being inclined in the opposite sense to said bearing axis.

6 Claims, 4 Drawing Figures

ROLLER BEARINGS

The present invention relates to roller bearings, for example bearings employed as pivotal mountings on large civil engineering plants such as cranes.

In the past it has been known to provide such bearings with one annular ring of rollers, adjacent ones of which are inclined to the axis of the bearing in the same or orthogonal directions. However, such bearings have severe limitations as to their use due to the relationship between the bearing diameter and the imposed surface stresses. This is often critical in the case of say tower cranes, when the bearing size is limited by the allowable width of the crane, but the crane's height and therefore its weight and the imposed stresses are such as to impose very high loads on the bearing.

In order to increase the loading capacity of this type of bearing, without increasing its diameter, according to the present invention a bearing assembly comprises inner and outer bearing rings having two axially spaced coaxial annular passages between the bearing rings and a number of rollers retained within the passages such that the axes of some of the rollers are inclined in one sense to the axis of the bearing and the axes of the other rollers are inclined in the opposite sense to the axis of the bearing.

Preferably the rollers are tapered, but, cylindrical or even barrel-shaped rollers could be used in the bearing assembly.

By providing two rings of rollers axially spaced, the loading capacity of the bearing can be doubled effectively. Normally, the use to which these bearings are put results in large axial loadings as well as torsional forces in vertical planes through the bearing axis. To enable the various types of loading to be withstood by the bearing the passages preferably have a substantially square cross-section, the diagonals of which are respectively substantially perpendicular and substantially parallel to the bearing axis. If tapered bearings are to be used then the cross-section of the passages will not be exactly square.

Preferably, there will be an equal number of rollers inclined in each direction, but the rollers may be arranged in a number of ways. In particular, the sense of inclination to the bearing axis of adjacent rollers in each passageway may be opposite or one passageway may contain rollers inclined in one sense and the other passageway the rollers inclined in the opposite sense. However, there are many other arrangements which would result in half the bearings being inclined in one sense and half in the other sense.

Four examples of bearings according to the present invention will now be described with reference to the accompanying drawings of which:

Figure 1:
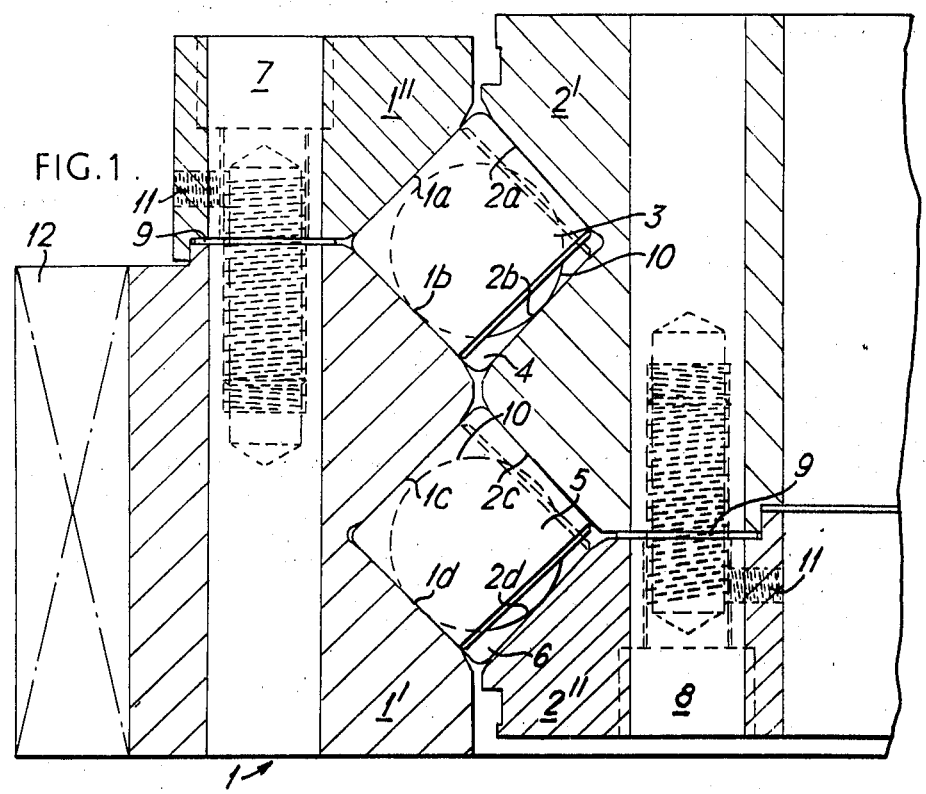
FIG. 1 is a cross section through a first bearing.

The bearing shown in FIG. 1 is intended for use in applications where the turning moment is large in comparison with the axial load and has its outer bearing ring 1 rigidly connected to the base of or support for a large piece of equipment, such as a crane, the inner ring 2 supporting the equipment itself and transferring the load to the outer ring 1 and hence to the support or base. Each bearing ring 1, 2 comprises two parts, a body part 1', 2' and a retaining piece 1'', 2''. By splitting each bearing ring thus insertion of the rollers is enabled as will be described later.

Each ring 1, 2, is formed with four bearing surfaces 1a, 1b, 1c, 1d or 2a, 2b, 2c, 2d which are arranged in a W-shaped formation. The uppermost surface 1a of the outer ring 1 and the lowermost surface 2d of the inner ring 2 are formed on the retaining parts 1'', 2'' respectively whereas the remaining surfaces are formed on the body parts 1', 2'. This particular arrangement is so that the weight of the equipment is transferred between the bearing surfaces which are on the body parts 1', 2' of the respective bearing rings 1,2. This is necessary because the retaining pieces 1'', 2'' are much smaller and therefore less rigid than the body parts 1', 2' and are merely bolted to the body parts by means of screws 7, 8 which engage threaded bores in the body parts 1', 2'. In order to ensure the correct spacing between the two parts of each ring spacing washers 9 are inserted between the faces of the two parts.

As can be seen in FIG. 1 the two annular rings formed, respectively, by the surfaces 1a, 2a, 1b, 2b, and 1c, 2c, 1d, 2d do not have exactly orthogonal surfaces, but are shaped so that tapered rollers 3, 4, 5 and 6 may be used. In each ring of rollers, adjacent rollers are inclined in opposite senses to the general axis of the bearing. Thus, the rollers 3 and 5 are inclined with their surfaces tapering downwardly and inwardly towards the centre of the bearing and the rollers 4 and 6 are inclined with their tapers directed upwardly and inwardly toward the bearing axis.

When the inner bearing ring 2 is loaded axially the load is transferred to the outer bearing ring 1 through the faces 2a, 1b, 2c, 1d and the rollers 3 and 5. As can be seen, this axial load, which in many cases is very large, is thus transferred through the bearings surfaces which are on the body parts 1' and 2' of the outer and inner bearing rings respectively and by half the rollers in each ring.

When, in, for example, the case of a crane a load is lifted off the ground by the crane, the fact that the load is lifted offset from the axis of the bearing means that there is a turning moment exerted on the bearing. Therefore, the front and rear halves of the bearing are subjected to different loadings. In the front half of the ring a positive moment load is supported by the faces 2a, 1b, 2c, 1d, and the rear half of the bearing by faces 1a, 2b, 1c, 2d. Any radial load which may be encountered is borne by the faces 2a, 1b, 1c and 2d.

Figure 2:
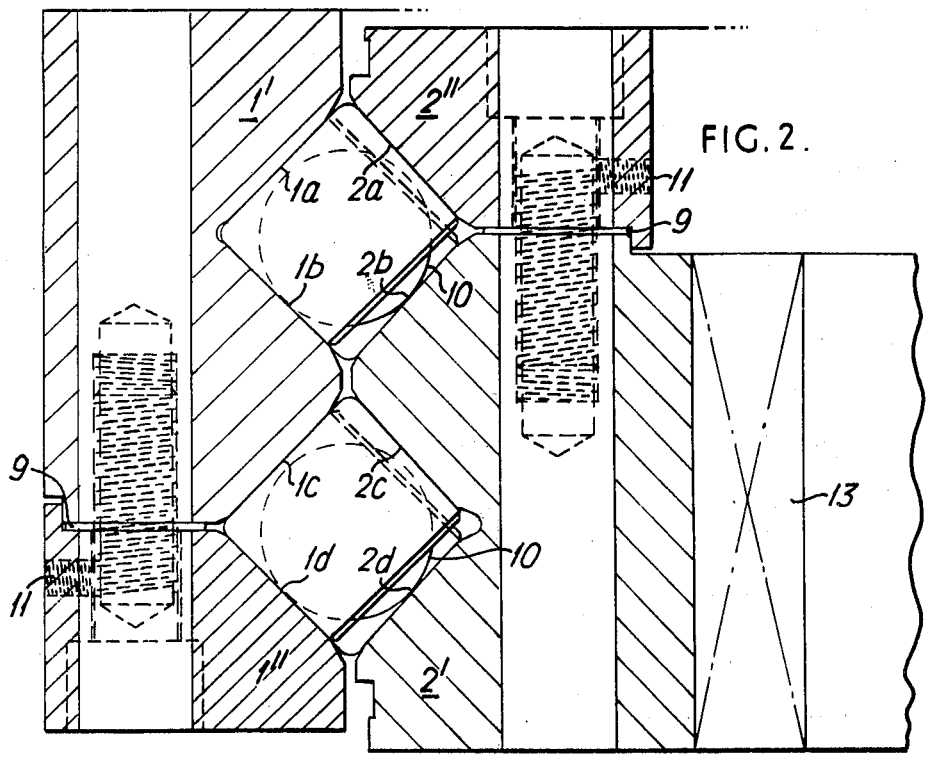
FIGS. 2, 3 and 4 are similar views of second, third, and fourth bearings respectively.

The same reference numerals are used in FIG. 2 which represents a bearing which is intended for use with the inner bearing ring 2 rigidly connected to the base of or support for a large piece of equipment and the outer ring 1 supporting the equipment itself. In this case, since the load is on the outer ring 1, it is the upper surface 2a of the inner bearing ring 2 and the lower surface 1d of the outer bearing ring 1 which are formed in the retaining pieces 2'' and 1'' respectively. In this case, axial loads are encountered by the faces 1l, 2b, 1c, and 2d, positive moment loads in the front half of the bearing by faces 1a, 2b, 1c, and 2d, positive moment loads in the rear half of the ring by faces 2a, 1b, 2c, and 1d, and radial loads by the faces 1a, 2b, 2c, and 1d.

Figure 3:
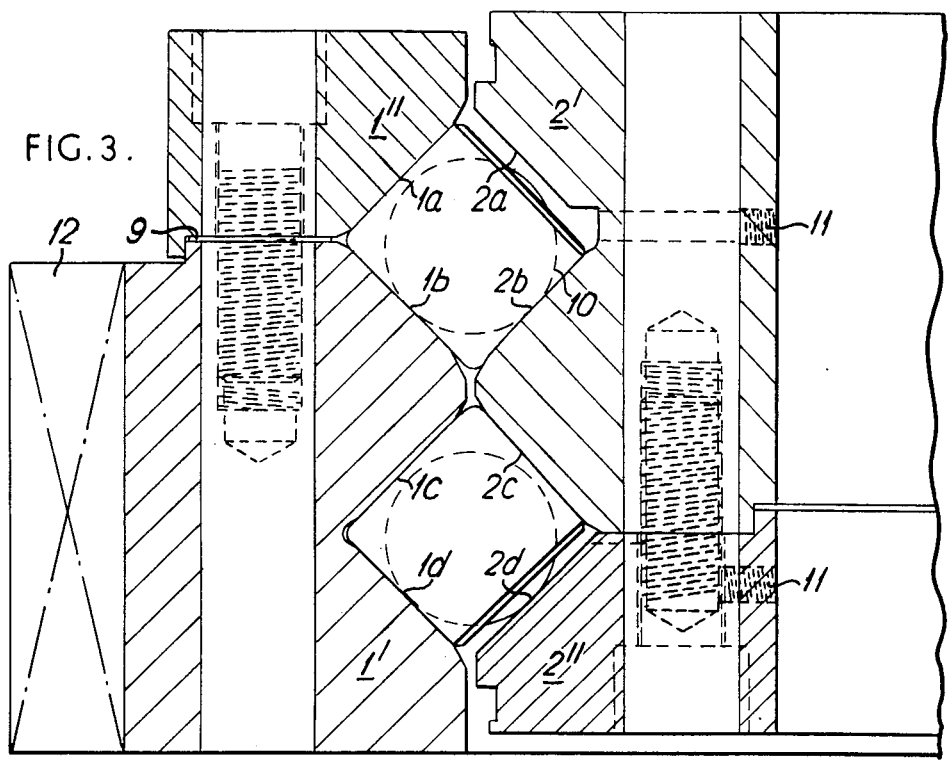
Figure 4:
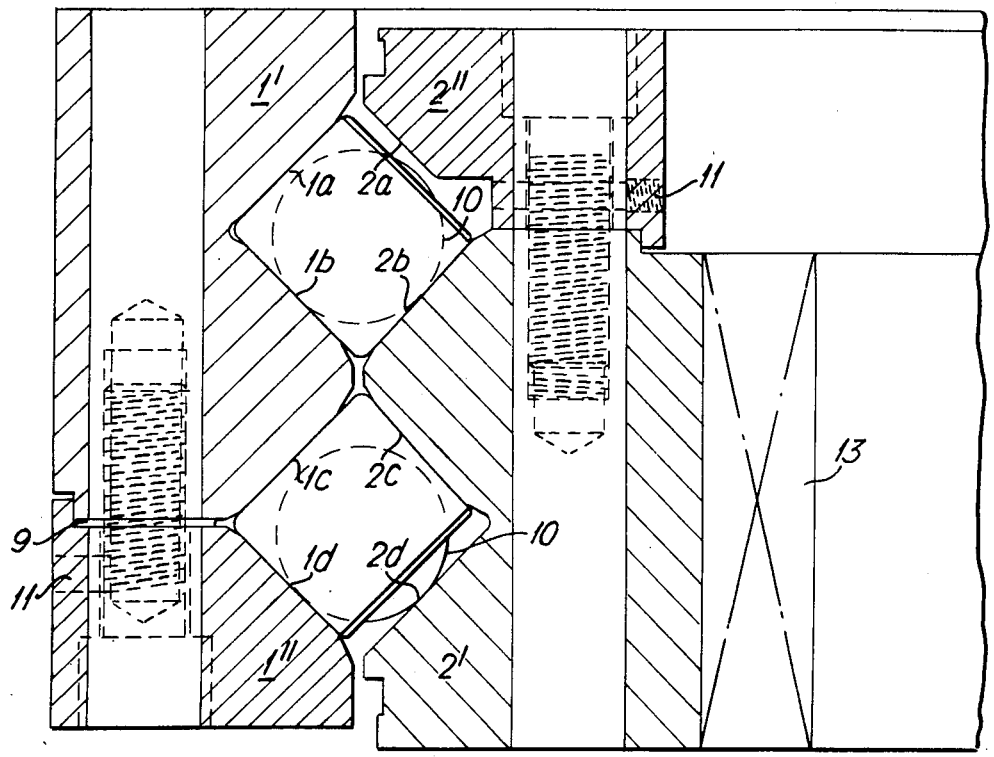

FIGS. 3 and 4 show bearings for application where the axial load is large in comparison with the turning moment and the bearings are similar to those shown in FIGS. 1 and 2 respectively. However, in these cases all the rollers in each ring are inclined in the same direction, and the rollers in the two rings are inclined in opposite directions. Again, the retaining pieces are provided in positions such that the huge axial loads are not borne by them, but by the body parts 1' and 2'.

In the bearing of FIG. 3, axial loads are borne by the faces 2c and 1d, that is to say all the rollers in the lower ring. Positive moment loads are catered for by faces 2c and 1d in the front half of the ring and by faces 1a and 2b in the rear half of the ring. Radial loads are catered for by faces 1a, 2b, 2c and 1d, faces 1b and 1c being provided only to locate the rollers positively, and faces 2a and 2d supporting no loads whatsoever.

In the bearing shown in FIG. 4, which is again a case in which the outer bearing ring 1 is intended to support the equipment per se and the inner bearing ring 2 is rigidly attached to the base of the equipment, the axial loads are catered for by faces 1a and 2b. The various other loads are catered for by the same faces as for the bearing shown in FIG. 3.

Each of the bearings shown in FIGS. 1 to 4 also contains nylon spacers 10 located between each roller. These spacers prevent adjacent rollers rubbing against one another to the detriment of the bearing assembly and thus prevent wear on the assembly. Furthermore, each of the bearing assemblies shown includes a grease channel or channels 11 which are arranged to deliver a lubricating grease to the rings of rollers. In some cases, as in FIGS. 3 and 4 some of the grease channels are directed straight into the roller rings, but in other cases the grease channels feed blind holes drilled in the retaining pieces 1'', 2'' parallel with the axis of the bearing assembly and feeding past the spacing washers or shims 9 into the rings of rollers.

Each of the bearings shown in the drawings also includes, in the case of FIGS. 1 and 3 an external toothed gear ring 12, and in the case of FIGS. 2 and 4 an internal toothed gear ring 13. By means of these gear rings the inner and outer bearing rings, respectively, may be driven by means of a further gear which is mounted indirectly on the inner or outer bearing ring respectively and which cooperates with the outer or inner toothed gear ring respectively to enable the load supported by the bearing to be driven around with respect to the fixed part of the bearing.

I claim:

1. A bearing assembly comprising: inner and outer bearing rings defining two axially spaced, coaxial, annular, quadrangular-sectioned passages between them, and a plurality of rollers retained in said annular passages, some of said rollers having axes which are inclined at a first angle to the axis of said bearing assembly and others of said rollers having axes which are inclined at substantially said first angle to said axis, but in an opposite sense, said inner bearing ring comprising a first part forming two sides of a first of said passages and one side of the second of said passages, and a second part forming one side of said second passageway, and said outer bearing ring comprising a first part forming two sides of said second passage and one side of said first passage, and a second part forming one side of said first passage.

2. A bearing assembly in accordance with claim 1, wherein said rollers are substantially frustoconical.

3. A bearing assembly in accordance with claim 1, wherein half of said rollers are inclined in one direction towards said bearing assembly axis and half said rollers are inclined in said other direction.

4. A bearing assembly in accordance with claim 3, wherein each of said annular passageways contain rollers, adjacent ones of which are inclined in opposite senses.

5. A bearing assembly in accordance with claim 3, wherein a first one of said annular passageways contains rollers inclined only in one of said directions and said other passageway contains rollers inclined only in said other direction.

6. A bearing assembly in accordance with claim 1, wherein each of said annular passageways is approximately square in cross section.

* * * * *